US010439433B2

(12) United States Patent
Golshani et al.

(10) Patent No.: US 10,439,433 B2
(45) Date of Patent: Oct. 8, 2019

(54) ADAPTIVE POWER GRID RESTORATION

(71) Applicant: University of Central Florida Research Foundation, Inc., Orlando, FL (US)

(72) Inventors: Amir Golshani, Orlando, FL (US); Wei Sun, Oviedo, FL (US); Qun Zhou, Oviedo, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 54 days.

(21) Appl. No.: 15/909,062

(22) Filed: Mar. 1, 2018

(65) Prior Publication Data

US 2018/0254662 A1    Sep. 6, 2018

Related U.S. Application Data

(60) Provisional application No. 62/465,438, filed on Mar. 1, 2017.

(51) Int. Cl.
*G06F 19/00* (2018.01)
*H02J 13/00* (2006.01)
(Continued)

(52) U.S. Cl.
CPC .......... *H02J 13/0048* (2013.01); *G06Q 50/06* (2013.01); *H02J 3/006* (2013.01);
(Continued)

(58) Field of Classification Search
CPC ............... H02J 13/0048; H02J 13/0072; H02J 13/0075; H02J 3/006; H02J 3/06;
(Continued)

(56) References Cited

U.S. PATENT DOCUMENTS 8,504,214 B2   8/2013   Genc et al.
8,527,107 B2 * 9/2013   Forbes, Jr. ............. G06Q 10/00
                                                    323/299
(Continued)

OTHER PUBLICATIONS

Sun, Wei, Chen-Ching Liu, and Li Zhang. "Optimal generator start-up strategy for bulk power system restoration." IEEE Transactions on Power Systems 26.3 (2010): 1357-1366. (Year: 2010).*

(Continued)

*Primary Examiner* — Michael D Masinick
(74) *Attorney, Agent, or Firm* — Neil Jetter; Jetter & Associates, P.A.

(57) ABSTRACT

A method of self-healing power grids after power outages includes providing an Adaptive Restoration Decision Support System (ARDSS) for generating a restoration solution using static and dynamic input data from power generator(s) powering transmission lines, from the transmission lines and loads. At a beginning of a restoration period a two-stage problem is solved including a first and second-stage problem with an optimal planning (OP) function as a mixed-integer linear programming (MILP) problem using initial static and dynamic data to determine start-up times for the power generator and energization sequences for transmission lines involved in the power outage. Only the second-stage problem is again solved with an optimal real-time (OR) function using the start-up times and energization sequences along with updated static and dynamic data to determine operating parameters for the grid. The restoration solution is implemented over restoration time steps until all loads involved in the power outage are recovered.

16 Claims, 8 Drawing Sheets

INITIAL RESTORATION PATHS FOR GENERATORS G1 AND G2 (DOTTED LINES), AND THE ALTERNATIVE RESTORATION PATHS FOR GENERATORS G1 AND G2 (SOLID LINES) AFTER THE OCCURRENCE OF A MAJOR CONTINGENCY.

(51) Int. Cl.
*H02J 3/06* (2006.01)
*H02J 3/00* (2006.01)
*G06Q 50/06* (2012.01)
*G06Q 10/06* (2012.01)

(52) U.S. Cl.
CPC ............ *H02J 3/06* (2013.01); *H02J 13/0072* (2013.01); *H02J 13/0075* (2013.01); *G06Q 10/0631* (2013.01); *H02J 2003/001* (2013.01); *H02J 2003/003* (2013.01); *H02J 2003/007* (2013.01)

(58) Field of Classification Search
CPC ........... H02J 2003/007; H02J 2003/001; H02J 2003/003; G06Q 50/06; G06Q 10/0631
See application file for complete search history.

(56) References Cited

U.S. PATENT DOCUMENTS

| | | | | |
|---|---|---|---|---|
| 2010/0152910 | A1* | 6/2010 | Taft | G01D 4/002 700/286 |
| 2011/0022239 | A1* | 1/2011 | Forbes, Jr. | G06Q 10/00 700/286 |
| 2013/0063272 | A1* | 3/2013 | Bhageria | H02J 13/001 340/650 |
| 2013/0238148 | A1* | 9/2013 | Legbedji | G06Q 10/04 700/286 |
| 2013/0289772 | A1* | 10/2013 | Friedrich | G05B 13/02 700/276 |
| 2014/0108851 | A1* | 4/2014 | Ishchenko | G06F 11/07 714/2 |
| 2014/0142909 | A1* | 5/2014 | He | G06F 17/5036 703/2 |
| 2015/0002186 | A1* | 1/2015 | Taft | G01D 4/002 324/764.01 |
| 2015/0278412 | A1* | 10/2015 | Ghosh | G06F 17/5009 703/2 |
| 2017/0070044 | A1* | 3/2017 | Wu | H02H 7/26 |
| 2017/0214250 | A1* | 7/2017 | Zietlow | H02J 3/18 |

OTHER PUBLICATIONS

Fukuyama, Yoshikazu, H-D. Chiang, and K. Nan Miu. "Parallel genetic algorithm for service restoration in electric power distribution systems." International Journal of Electrical Power & Energy Systems 18.2 (1996): 111-119. (Year: 1996).*
Adibi, M. M., and L. H. Fink. "Power system restoration planning." IEEE Transactions on Power Systems 9.1 (1994): 22-28. (Year: 1994).*
Paul A. Trodden, et al., "Optimization-Based Islanding of Power Networks Using Piecewise Linear AC Power Flow", IEEE Transactions on Power Systems, vol. 29, Issue 3, May 2014, IEEE Power & Energy Society, pp. 1212-1220.
Wei Sun, et al., "Optimal Generator Start-Up Strategy for Bulk Power System Restoration", IEEE Transactions on Power Systems, vol. 26, Issue 3, Aug. 2011, pp. 1357-1366.

* cited by examiner

COMPARISON BETWEEN RESTORATION PATH, FIRST-STAGE SOLUTION (SOLID LINE) PRIOR ART, AND ARDSS SOLUTION (DOTTED LINE) FOR $t=11$ RESTORATION TIME.

TOTAL ACTIVE AND REACTIVE LOAD CURVES DURING THE RESTORATION

VOLTAGE PROFILE BEFORE AND AFTER BUS ENERGIZATION

INITIAL RESTORATION PATHS FOR GENERATORS G1 AND G2 (DOTTED LINES), AND THE ALTERNATIVE RESTORATION PATHS FOR GENERATORS G1 AND G2 (SOLID LINES) AFTER THE OCCURRENCE OF A MAJOR CONTINGENCY.

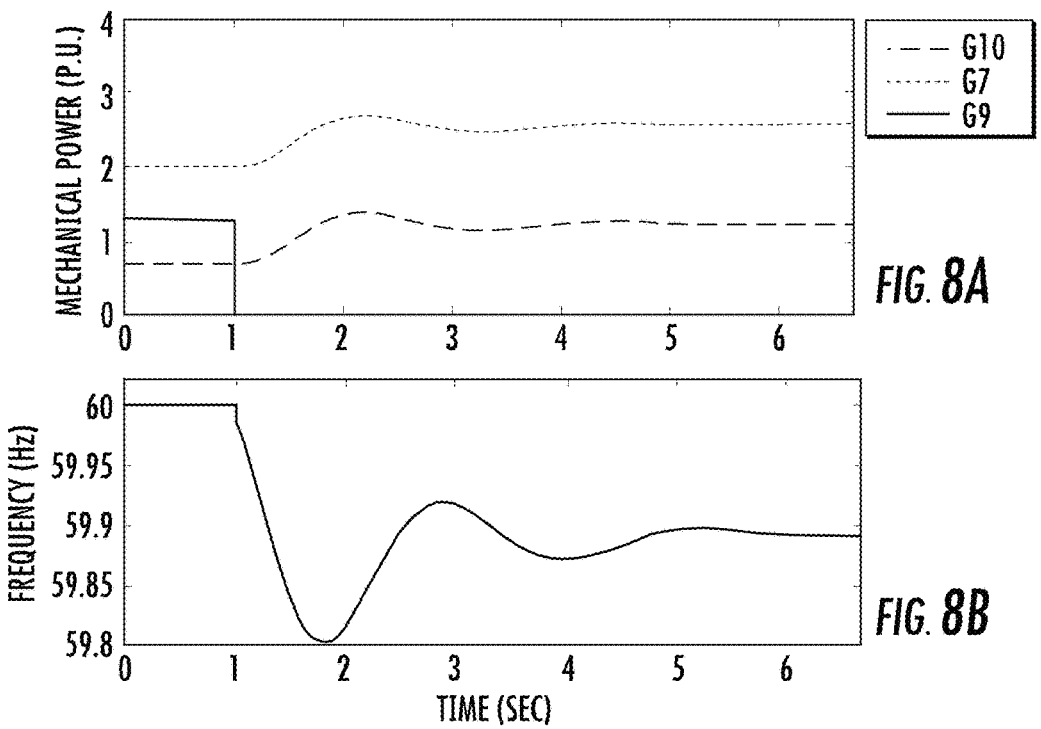
FIG. 8A
FIG. 8B
GENERATORS MECHANICAL POWER AND SYSTEM FREQUENCY TRACES AFTER THE CONTINGENCY
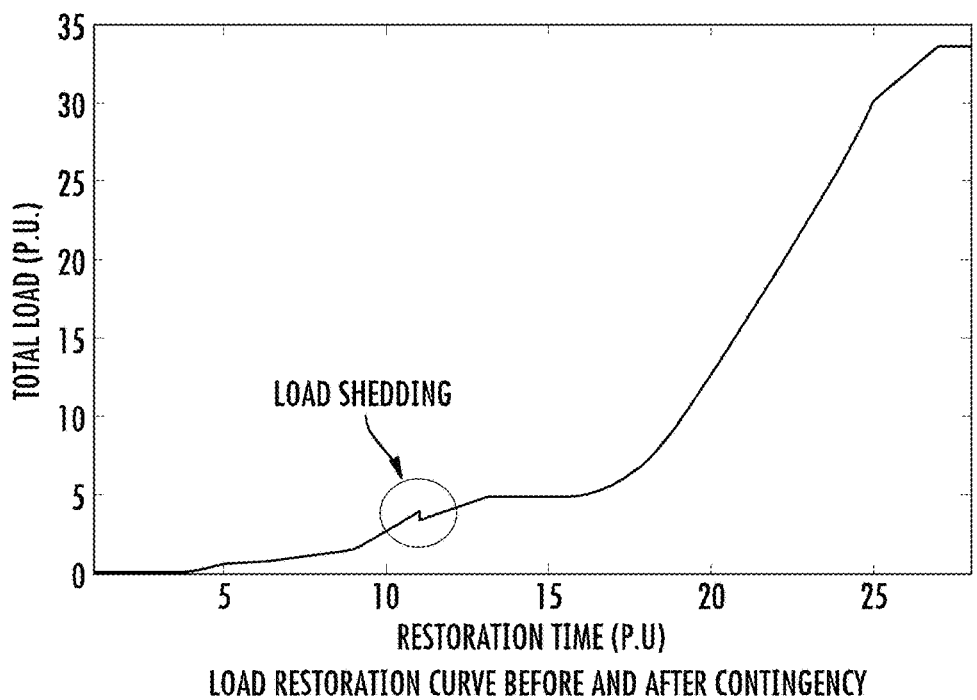
LOAD RESTORATION CURVE BEFORE AND AFTER CONTINGENCY
FIG. 9

ADAPTIVE POWER GRID RESTORATION

CROSS REFERENCE TO RELATED APPLICATIONS

This application claims the benefit of Provisional Application Ser. No. 62/465,438 entitled "Self-healing Power Grid", filed Mar. 1, 2017, which is herein incorporated by reference in its entirety.

U.S. GOVERNMENT RIGHTS

This invention was made with U.S. Government support under National Science Foundation (NSF) grant number 1552073. The Government has certain rights in this invention.

FIELD

Disclosed embodiments relate to power system restoration for power grids.

BACKGROUND

An electric power system is a network of electrical components deployed that generates, transfers, optionally stores, and uses electrical power. An electric power system comprises power generator(s), transmission lines, and various customers (or "loads"). Power received from the power generator(s) is transferred to various loads over the transmission lines that includes transformers therein.

A 'power grid' as used herein is an interconnected network within the power system used for transmission and distribution of power from the power generator(s) including the power lines and the transformers to the loads. The power generators can include coal and natural gas-burning power plants, hydroelectric dams, nuclear power plants, wind turbines, and solar panels which all generate electrical power. Power grids are designed and controlled to be run at a single frequency and to supply voltages at largely constant amplitudes which is achieved with varying load demand, including variable reactive loads, and even nonlinear loads, with electricity provided by power generators and distribution and transmission equipment such as transmission lines that may not always be reliable.

Power outages in locations throughout the world including in the United States (US) is becoming a commonplace event due to the increase in both frequency and strength of natural disasters. Another threat to power grids is cyberattacks. For instance, in 2012, hurricane Sandy devastated the power grid along the northeast coast of the US, leaving more than 8 million people without power for over a week. Power outages cost industries and businesses in the US billions of dollars and can jeopardize the lives of hospital patients. According to the Electric Power Research Institute, across all business sectors the US economy loses over 150 billion dollars a year due to power outages.

Power system operators are currently guided by a series of power restoration plans prepared offline based on a set of power outage (or blackout) scenarios. Major independent system operators (ISOs) in the US provide restoration manuals to guide operators to deal with disturbance conditions or after a power outage. Offline restoration plans are developed to assist power system operators to bring the power back online after a major power outage. However, the offline restoration plans need to be constantly checked against system conditions that can change over time. As a result, recovery of the power grid from a power outage is often prolonged and power system operators can face tremendous pressure. Moreover, unexpected events can occur during the restoration process, such as the loss of power generator(s) or transmission lines, imposing further challenges for power grid restoration.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize economic losses to businesses due to power outages can be significantly reduced by a fast, reliable and flexible self-healing power grid tool. This self-healing power grid tool should consider both the steady-state and transient behavior of the power grid to reduce the recovery time from a power outage, as well as to ensure power system security. However, there is significant complexity and dimensionality in solving the power restoration problem for power grids.

This power restoration problem is solved herein by an adaptive restoration approach referred to herein as an adaptive restoration decision support system (ARDSS) which comprises a multi-stage model with each stage interacting with each other. The ARDSS provides a self-healing power grid which implements a restoration solution that is both fast and efficient as compared to conventional single-stage models for restoration of a power grid after a power outage by solving a two-stage optimization problem. The two-stage optimization problem includes a first-stage problem and a second-stage problem, and uses an optimal planning (OP) function for an initial restoration time step (and again after a contingency if it occurs during the restoration period) and an optimal real-time (OR) function for later restoration time steps. A two-stage optimization problem means that the first-stage and second-stage problems are solved concurrently. The OR function is a simplified version of the OP function.

As used herein the term "OP function" refers to a planning function which determines restoration planning solutions right after the power outage. The OP function is a two-stage optimization problem whose first-stage is to maximize the generation capability of the power system and the second-stage optimization problem looks to minimize the total unserved load. The solution by the OP function determines start-up times for the power generators involved in the power outage and energization sequences for the transmission lines involved in the power outage (or after a contingency occurring during the restoration period). As used herein the term "OR function" refers to functions which run at each restoration time step after the initial step using start-up times for the power generators involved in the power outage and energization sequences (from solution of the OP function) along with updated static and dynamic input data from the power grid that reflects grid components coming online. The OR function solves an optimization problem whose objective function is to minimize the total unserved load. The OR function determines an optimal dispatch of the generation(s), load pickup size and location, and the dynamic reserve on online power generators.

It is recognized that the initial solution of OP function is not accurate enough as the measurement units providing data from the power grid such as from a supervisory control and data acquisition (SCADA) system or Phasor Measurement Unit (PMU) are offline at beginning of restoration process unless they have an uninterruptible power supply (UPS) which is not typical. Thus, although both the OP function and OR function generate restoration solutions, the initial restoration solution obtained from the OP function is utilized at initial time of restoration before it is possible to obtain accurate measurement data. However, during the real-time restoration, the OR function uses real-time and generally accurate data coming from the measurement units reflecting power grids component coming online enabling making more accurate decisions and thus better restoration solutions.

Thus, as the restoration process proceeds, more accurate data becomes available from the field, and the OR function is thus able to generate more accurate restoration solution results that can be used by the power system operator. As described above, the OR function is a simplified version of the OP function. This means to create the OR-based optimization problem, some of the decision variables (i.e., the first-stage decision variables) are removed from OP problem. For that reason the OR function has only the second-stage optimization problem, while the OP function solves both the first-stage and second-stage problem. Therefore the size of the OR function is reduced relative to the OP function which reduces the computation time that can be an important aspect in a real-time power restoration process.

The ARDSS thus automatically generates a restoration solution using static and dynamic input data received regarding at least one power generator coupled to power transmission lines, from the transmission lines and loads. At a beginning of a restoration period a two-stage problem is solved including a first and second-stage problem with an OP function as a mixed-integer linear programming (MILP) problem using initial static and dynamic data to determine start-up times for the power generator and energization sequences for transmission lines involved in the power outage. Only the second-stage problem is solved with an OR function using the start-up times and energization sequences along with updated static and dynamic data to determine operating parameters for the grid. The restoration solution is implemented over restoration time steps until all loads involved in the power outage are recovered.

BRIEF DESCRIPTION OF THE DRAWINGS

FIGS. 8A and 8B show generators' mechanical power and system frequency traces after a contingency, respectively.

FIG. 9 shows load restoration curve before and after a contingency during the restoration time showing load shedding.

DETAILED DESCRIPTION

Figure 1:
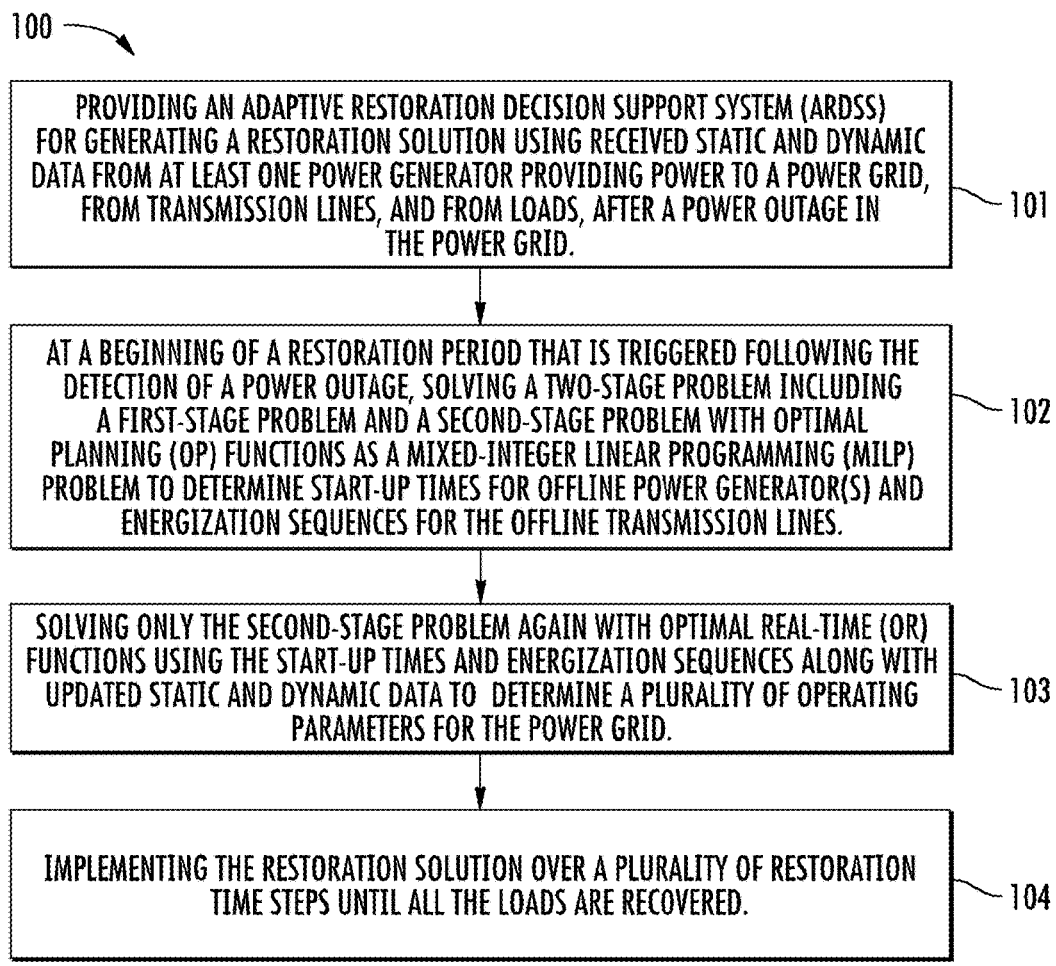
FIG. 1 is a flow chart that shows steps in an example adaptive method of self-healing an electrical power grid after a power outage using a disclosed ARDSS, according to an example aspect.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 3A:
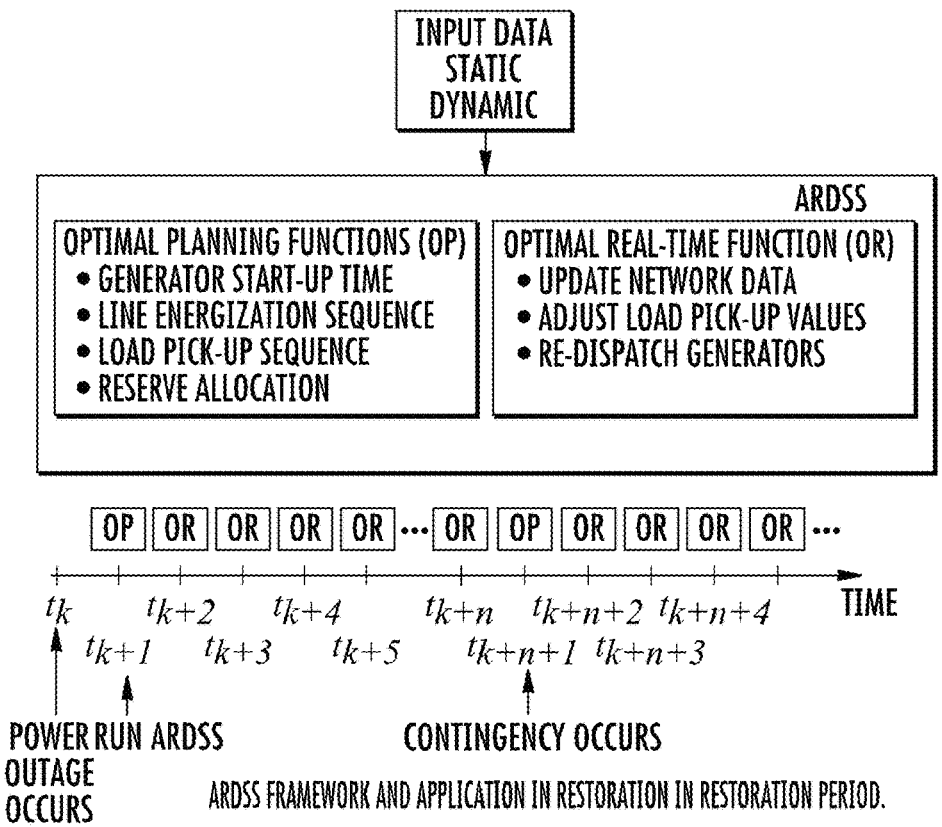
FIG. 3A shows an example ARDSS framework and its application in a restoration period after a power outage occurs in a power grid with an example timeline shown, according to a disclosed embodiment.

As noted above, a disclosed ARDSS utilizes an OP function at an initial time step and an OR function at subsequent time steps, with the OP and OR functions executed at specific time periods referred to herein as being restoration time steps in the restoration time period that follow a power outage, shown with the example timeline in FIG. 3A described below. The OP function is executed at the early stages of restoration, generally the first restoration time step and in the case a contingency occurs during the restoration period right after the contingency (e.g., an outage of one of the power generators or transmission lines or the shorting of a load(s)), while the OR function is run periodically at each restoration time step after the initial time step.

The OP and OR function used as known in the art may both be implemented by hardware or be implemented by software. Regarding hardware-based implementations, algorithm equations can be converted to a logic gate pattern, such as using VHDL (a Hardware Description Language) that can then be realized using a programmable device such as a field-programmable gate array (FPGA) or a dedicated application-specific integrated circuit (ASIC) to implement the logic gate pattern. Regarding software-based implementations, code for such functions stored in a memory can be implemented by a processor. The processor can comprise a digital signal processor (DSP), a microcontroller, an application specific integrated circuit (ASIC), a general processor, or any other combination of one or more integrated processing devices.

FIG. 1 is a flow chart that shows steps in an example adaptive method 100 of self-healing an electrical power grid after a power outage using a disclosed ARDSS, according to an example aspect. Method 100 comprises a multi-stage problem solution using received static data and dynamic input data generally from phasor measurement units (PMUs) or from supervisory control and data acquisition (SCADA) systems regarding the power generators, the transmission lines, and the loads. The power system can be essentially any power system including a power grid comprising power generators, transmission lines, transformers, and loads. A power outage, also known as a blackout is defined herein and known in the art to be the loss (either short-term or long-term) of electric power to a particular area of the power grid resulting in some loads losing power that can occur due to the loss of a power generator(s), the downing of loss of a transmission line(s), or the shorting of a transformer or the shorting of a load.

Step 101 comprises providing an ARDSS that can be integrated into the EMS installed in a control room of a power system, such as a Transmission System Operator (TSO) or Independent System Operator (ISO) control room. See the EMS 211 in the power system 200 shown in FIG. 2 described below. The ARDSS solves a multi-stage optimization problem using received static data and dynamic input data from at least one power generator providing power to the power grid, from the transmission lines, and from the loads.

Step 102 comprises at a beginning of a restoration period that is triggered following the detection of a power outage solving a two-stage problem including a first-stage problem and a second-stage problem with OP functions as a MILP problem using the initial static and dynamic input data to determine start-up times for the currently offline power generator(s), and energization sequences for the currently offline transmission lines. As described above, the input data is generally provided by field personnel, the power generator owner, transmission system operator, or power distribution system operators, such as over a telephone or wireless communication system, where input data from the offline components due to the power outage will generally not be available after the power outage due to the power outage, unless they have an UPS.

Step 103 comprises solving only the second-stage problem again with OR functions using the start-up times and energization sequences along with updated static and dynamic input data, again provided by field personnel, the power generator owner, transmission system operator, or power distribution system operators, generally updated by the measurement units such as SCADA and PMU, to determine a plurality of operating parameters for the power grid. Step 104 comprises implementing the restoration solution over a plurality of restoration time steps until all the loads are recovered, so that the power grid regains an operating condition present before the power outage.

The solving of the second-stage problem (step 103 implementing OR functions using the start-up times and energization sequences with updated input data to determine a plurality of operating parameters for the power grid) can be implemented as an extended problem with added first and second sub-problems being framed and solved for more complicated restoration problems, such as for primary frequency control and transient stability analysis. The extended problem comprises also computing using OR functions an initial condition of the power generators using non-linear equations, a frequency response of the power system using the initial conditions of the power generators as an operating parameter for the power grid, and generally a plurality of other operating parameters for the power grid.

The OR function generally comprises a simplified version the OP function. The computation time for the OR function is thus less than for the OP function because the former has less decision variables (integer variables). Moreover, since the OR function is a one-stage optimization (only has the second-stage optimization problem), while the OP function is a two-stage optimization problem (first-stage and second-stage problem), the OR function can be solved faster.

Figure 2:
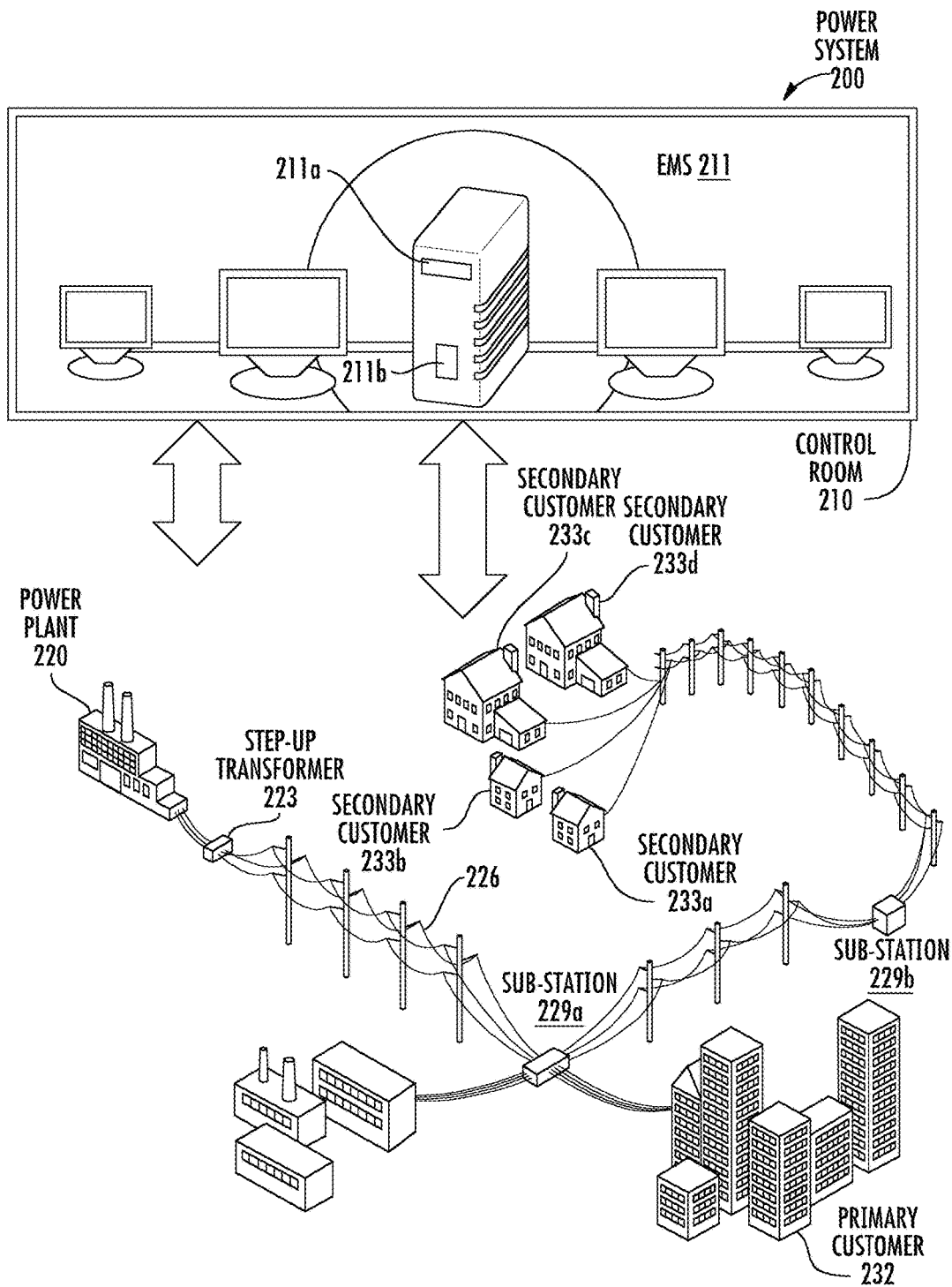
FIG. 2 depicts a power system including a disclosed ARDSS for self-healing an electrical power grid after a power outage, where the ARDSS is located within an energy management system (EMS) installed within a control room of the power system, where the power system comprises power plants powering a power grid comprising transformers, transmission lines, with optional sub-stations, and loads such as factories and housing units.

FIG. 2 depicts an example power system 200 including a disclosed ARDSS that is located within an EMS 211 installed within a control room 210 of the power system 200 for self-healing an electrical power grid after a power outage. The EMS 211 shown comprises a computer system 211a comprising a processor that has an associated memory 211b which has a disclosed ARDSS stored therein for providing a restoration solution, such as responsive to the failure of a transmission line 226.

The control room 210 controls the power grid, such as via a control system comprising a SCADA system or a PMU. The power grid comprises transmission lines 226 receiving power from at least one power generator shown as a power plant 220, with optional sub-stations 229a and 229b, and loads shown as primary customers 232 shown as apartment buildings, and secondary customers shown as 233a, 233b, 233c and 233d such as factories and some housing units. A step-up transformer 223 is shown coupled to step-up the voltage level received from the power plant 220. For simplicity, a step-down transformer near the customers that is normally present in the power system is not shown in FIG. 2.

The ARDSS processes receives static and dynamic input data. Static inputs include power generator and transmission line parameters and power system topological information. Dynamic inputs are system states based on real-time measurements generally obtained from PMUs or from SCADA systems, where the data signals are sent to the control room 210 for processing by the ARDSS. With the initial outage conditions such as the availability of power generators and transmission lines, system operators run the ARDSS to automatically determine the restoration plan.

As described above, at the beginning of a restoration period that is triggered following a power outage a two-stage problem including a first-stage problem and a second-stage problem is solved using an OP function which as described above uses the initially available static and dynamic input data to provide a step-by-step restoration action list. The restoration action list generally includes starting times for all the power generators, energization times of all buses and power lines, the optimal location and amount of loads to pick up, and the amount of dynamic reserve to ensure system security.

As the restoration process proceeds, more power generators, transmission lines and loads come online, leading to the changes of system dynamic characteristics and thus enabling use of updated input data, including some data from previously offline components as they come online. Then only the second-stage problem is again solved with an OR function using the start-up times and energization sequences along with updated static and dynamic data to determine a plurality of operating parameters for the power grid, which is typically run every few minutes (e.g., 10 minutes) after first restoration time step. With the pre-determined solutions provided by the OP function, the OR function can then be quickly solved. Should contingencies occur during the restoration period, such as power generator outage or the trip of transmission lines, the OP function can generally be re-run based on the updated system states. For example, online generators can be re-dispatched to provide a sufficient amount of power to ensure system reliability in the case of contingencies.

A sliding window approach can be used to improve the computational efficiency of the second stage problem solved by the OR function. When contingencies occur, the power system topology changes and some of initially determined paths may become unavailable. As shown in FIG. 3A, when a major power grid contingency occurs, such as the outage of a transmission line, occurring at $t_{k+n+1}$ an OP function is again called. Note that at this moment, the size and computational time of the optimization of the first-stage and second-stage problem will be considerably smaller than the original first-stage and second-stage problem earlier solved by the OP function at $t_{k+1}$.

The load recovery action is initiated from a very early instance of the restoration for preserving the stability of the power system, and as described above lasts until the full recovery of all the de-energized loads. The affected area of the power grid containing the de-energized loads is thus restored swiftly in a way that the security of system is preserved. The ARDSS provides an efficient and precise self-healing power grid tool that can identify the optimal locations and amount of loads to be restored without violating the minimum frequency constraint (i.e., 59.5 Hz for North America).

The ARDSS measures the ability of the system to control the frequency, e.g. from frequency trajectory, and ensures that power generators under-frequency relays or load shedding relays are not being activated following the largest credible contingency on the power system. Failing to do so can lead to undesirable load shedding repetition or oscillation between shedding and restoration. One of the main tasks of frequency control is recognized to be to counteract the sudden load change and recover the frequency before the power outage. It is also recognized that the initial rate of frequency decay depends merely on the size of contingency as well as the inertia of the power system. Subsequently, the recovery is assisted by governors' actions and damping effects of loads. These are typically the determining factors used for identifying the frequency response of the power grid.

Generally, the amount of active and reactive loads change upon system voltage and frequency. Loads are generally energized according to their priorities, and their influences on system frequency depend on the size of loads and load characteristics. In particular, frequency dependent loads have influence on the frequency response after energization. The OR function can generally only estimate the amount of load pickup and the needed dynamic reserve without a precise frequency constraint. This is because as described above the OR function typically runs every 10 minutes, whereas the primary frequency response of system subsequent to a contingency generally lies in the range of 0.1 to 10 seconds.

Figure 3B:
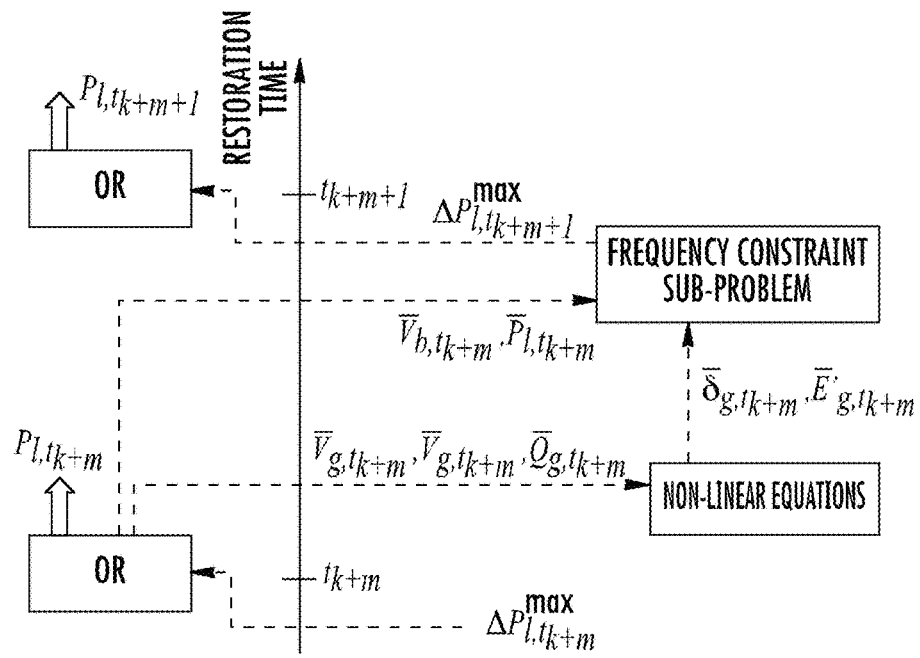
FIG. 3B shows a frequency-constrained sub-problem.

To overcome this timing issue, a disclosed frequency-constrained sub-problem is introduced and integrated (added) into the second-stage problem solved by the OR function as shown in FIG. 3B. In this model, a simplified dynamic model of the power grid is used to determine the location and amount of load during the restoration period.

Generally, loads with higher priorities, are restored first, where a load's priority shows its importance. For example, hospitals and those loads with high outage costs have higher priorities and thus should be energized faster to reduce the cost incurred from the outage of substantial infrastructure. However, loads having the same priorities but different impacts on the frequency response of the system should be ranked in order to further improve the restoration performance. A load's priority has nothing to do with frequency response.

Firstly, the amount of energized loads will have impact on the rate of change of frequency (ROCOF) as well as the frequency nadir (lowest point). Secondly, if the locations of the energized loads are not precisely determined, some generators are severely impacted, whereas, others are only moderately affected. This can necessitate the development of an ARDSS that determines the location and amount of loads at each restoration step without putting the security of the power system at risk. In this regard, a fast and efficient frequency constrained optimization tool is disclosed that extends the second-stage problem solved by the OR function to further comprise solving additional sub-problems.

In this extended ARDSS formulation, the frequency of generators and load buses can be calculated considering the governors' models and load frequency dependency factors. As described above, loads are generally energized according to their priorities. However, a load's influences on the power system frequency are contingent upon their sizes and characteristics. Generally, the values of active and reactive loads vary when the system voltage and frequency change. In particular, frequency dependent loads have influence on the frequency trace after the energizations. An example disclosed real-time frequency constrained ARDSS is shown in FIG. 3B which has stages representing two linear optimization problems and one non-linear algebraic problem.

In the extended ARDSS formulation the second-stage problem solved with an OR function (a MILP type) can consider the load priorities as well as the voltage dependencies of the loads. The OR function solution can be realized through a receding horizon approach. For the receding horizon approach, at each restoration time step, the objective function of the OR function is minimized, subject to the certain constraints, over a time horizon of the restoration. The total restoration horizon length is discretized into a number of time intervals $t1; t2; \ldots ; tk; tk+1; \ldots ; tT$. The solution of the OR problem provides the optimal dispatch plan of the conventional generators over the restoration horizon. Also, this ensures the convergence of the load flow after recovering the loads with the estimated values and locations. It should be noted that only the first set of power and load references that calculated for the first time interval is generally implemented in practice. The solving of additional sub-problems use the results of the initial second stage problem.

In this approach, the OR solution in one sub-problem considers the voltage dependency of load (a ZIP model; further described below), and ensures the convergence of load flow under the estimated load pickup values and locations. Whereas, the frequency-constrained other sub-problem adjusts the amount of load pickup such that the resulting frequency response will not exceed a predetermined permissible limit. The objective function of the OR problem is to maximize the load pickup amount whose value is updated after solving frequency-constrained sub-problem.

The output of the OR function after solving the first-level problem contains the voltages and angles of all transmission buses (sub-stations) that constitute a set of nonlinear algebraic equations. Having solved the original second-stage problem, the parameters pertaining to the restoration time $t_{k+m}$ are forwarded to a first sub-problem. The solution to the first sub-problem can compute the initial values of machine rotor angles and EMF magnitudes for use by the second sub-problem whose main task is to determine the optimal location and amount of the load for recovery. The second sub-problem is a linear optimization problem that comprises the generator swing equations (defined in problem formulations 9.1 and 9.2), governor models load frequency define in problem formulation 9.13, and load dynamics for all the machines and loads in the power system.

By solving the non-linear equations in the first sub-problem one can derive the classical model of synchronous generator, the voltage behind transient reactance model. In the frequency-constrained second sub-problem, a simplified and lossless model of power network can be constructed. The objective is to maximize the load pickup during the transient period while the frequency of load and generator buses should not violate their limits. It is noted that voltage control is assumed to be much faster than the dynamics of interest, therefore, internal generator voltages are assumed constant. To integrate the swing equations as well as governor models into the second sub-problem, the differential equations can be discretized using the trapezoidal rule which is known as an implicit integration method. For example, the trapezoidal method takes the average of the function at the previous point and the new point. Doing so, the differential equations can be converted to a set of linear algebraic equations in which the integration time step determines the accuracy and size of the sub-problem. The output of the second sub-problem can determine $\Delta P_t^{max}$ for each restoration time step and update the maximum load pickup capability in the OR problem.

First-Stage Problem Solution

The objective of the first-stage problem solution using an OP function is to maximize the total energy served by all power generators in the power system through starting up more power generators (or equivalently, to minimize negative energy supply), and to minimize the value function of the second stage problem, $\varphi(u)$, as shown in (1).

$$\text{Minimize}\left(-\sum_{t \in T}\sum_{g \in G}(P_g^{max} - P_g^{start})u_{g,t}^{on} + \varphi(u)\right) \quad (1)$$

where, the binary decision variable $u_{g,t}^{on}$ is the status of generator g at restoration time t with "0" meaning offline or starting up, and "1" meaning online. First-stage decision are binary variables: $u_{g,t}^{on}$, $u_{b,t}^{bus}$ and $u_{k,t}^{line}$. In (1), and u is the vector of first-stage decisions.

First-Stage Constraints

The first-stage problem includes three groups of constraints, and all decision variables satisfy $\forall t \in T$, $\forall g \in G_{NBSU}$, $\forall nm \notin K$, $\forall (n,m) \in B$.

Generator Output Constraint

The start-up characteristic of non-blackstart units (NBSUs) is shown in equation (1.1) below, where an integer variable $t_g^{start}$ and a parameter $T_g^{start}$ represent start-up and cranking times. $P_g^{start}$ is the cranking power of power generator g. More details regarding the MILP representation of constraint (1.1) below can be found in a paper by W. Sun, C. C. Liu, and L. Zhang, "Optimal generator start-up strategy for bulk power system restoration," {IEEE Trans. Power Syst.}, vol. 26, no. 3, pp. 1357-1366, June 2011 which is incorporated by reference herein.

$$P_{g,t}^{start} = \begin{cases} 0 & 0 \le t < t_g^{start} \\ P_g^{start} & t_g^{start} \le t \le t_g^{start} + T_g^{start} \end{cases} \quad (1.1)$$

Note that for $t < t_g^{start} + T_g^{start}$ generators' outputpower follow their start-up function, $P_{g,t}^{start}$. Whereas, for $t > t_g^{start} + T_g^{start}$ generators' scheduledpower are determined in the second-stage problem, denoted by $P_{g,t}$.

Start-Up Time Constraints

Generation unit g can go online only after its start-up time has elapsed, as shown in equation (1.2). The binary variable $u_{g,t}^{statrt}$ is 1 if unit g is starting up; otherwise is 0. The relationship between $t_g^{start}$ and $u_{g,t}^{start}$ are shown in equation (1.3).

$$\sum_{t \in T}(1 - u_{g,t}^{on}) \ge \sum_{t \in T}(1 - u_{g,t}^{start}) + T_g^{start} \quad (1.2)$$

$$t_g^{start} = \sum_{t \in T}(1 - u_{g,t}^{start}) \quad (1.3)$$

Buses and Lines Energization Constraints

The relationship of bus and transmission line energization can be modeled as following: constraint (1.4) shows that NBSUs can be started after energizing their corresponding buses $b_i$; constraint (1.5) shows that if both connected buses are de-energized at restoration time t, then the line is de-energized at time t; constraint (1.6) shows that if either bus is energized, the line can be energized at t+1 or remains de-energized; while, if a line is energized at t+1, buses at both ends of that line should be energized at t+1.

$$u_{g,t}^{start} \le u_{b_i,t}^{bus} \quad (1.4)$$

$$u_{nm,t}^{line} \le u_{n(m),t}^{bus} \quad (1.5)$$

$$u_{nm,t}^{line} \le (u_{n,t}^{bus} + u_{m,t}^{bus}) \quad (1.6)$$

Second-Stage Problem Solution

The objective of the second-stage problem solution using OR functions is generally to minimize total unserved load plus a penalty function, as shown in equation (2) below. The penalty function includes two positive continuous variables, $q_{g,t}^+$ and $q_{g,t}^-$, which are fictitious reactive power sources installed at generation buses to ensure the feasibility of the optimization problem. These variables can be utilized for generating a set of optimality cuts to speed up the convergence of solution algorithm. Parameter $\alpha_l$ is each load's priority factor, $P_{l,t}^{max}$ shows the maximum restorable load, $P_{l,t}$ denotes the total restored load at load bus 1 and restoration time t.

$$\varphi(u) = \text{Minimize}\left\{\sum_{t \in T}\sum_{l \in L}\alpha_l(P_{l,t}^{max} - P_{l,t}) + \sum_{g \in G}M(q_{g,t}^+ + q_{g,t}^-)\right\} \quad (2)$$

Second-Stage Constraints

The second-stage problem includes five groups of constraints, and all decision variables satisfy $\forall t \in T$, $\forall g \in G$, $\forall nm \in K$, $\forall (n,m) \in B$, $\forall l \in L$. Also, the first-stage decision variables appeared in the second-stage constraints are considered as constant parameters and denoted with a hat sign.

Power Balance Constraint

Real and reactive power limits of each generator are shown in (2.1)-(2.2). Real and reactive power balances are presented in (2.3)-(2.4).

$$P_g^{min}\overline{u}_{g,t}^{on} \le P_{g,t} \le P_g^{max}\overline{u}_{g,t}^{on} \quad (2.1)$$

$$Q_g^{min}\overline{u}_{g,t}^{on} \le Q_{g,t} \le Q_g^{max}\overline{u}_{g,t}^{on} \quad (2.2)$$

$$\sum_{g \in G}(P_{g,t} - P_{g,t}^{start}) - \sum_{l \in L} P_{l,t} = \sum_{nm \in K} P_{nm,t}^{flow} \quad (2.3)$$

$$\sum_{g \in G}(Q_{g,t} + q_{i,t}^{+} = q_{i,t}^{-}) - \sum_{l \in L} Q_{l,t} = \sum_{nm \in K} Q_{nm,t}^{flow} \quad (2.4)$$

where, $P_{nm,t}^{flow}$ and $Q_{nm,t}^{flow}$ denote the real and reactive power flow of transmission line between buses n and m. The fictitious reactive power sources in the penalty function are also included in (2.4).

Linearized AC Load Flow and Transmission Line Constraints

A linearized model of AC power flow equations through convex approximation are presented in (2.5)-(2.6). The N-piecewise linear approximation of cosine function using binary variables is shown in (2.7), where the cosine function is divided into $N_r$ equal sections and approximated by choosing appropriate values of $z_{nm,r}$ and $\alpha_{nm,r}$ (as referred to in a paper by P. A. Trodden, W. A. Bukhsh, A. Grothey, and K. I. M. McKinnon, "Optimization-based islanding of power networks using piecewise linear AC power flow," IEEE Trans. Power Syst., vol. 29, no. 3, pp. 1212-1220, May 2014, which is incorporated by reference herein.

$$P_{nm,t}^{flow} = (2V_{n,t}-1)g_{nm} - (V_{n,t}+V_{m,t}+y_{nm,t}-2)g_{nm} - b_{nm}\theta_{nm,t}, n \ne m \quad (2.5)$$

$$Q_{nm,t}^{flow} = -(2V_{n,t}-1)(b_n + b_n^c) - (V_{n,t}+V_{m,t}+y_{nm,t}-2)b_{nm} - g_{nm}\theta_{nm,t}, n \ne m \quad (2.6)$$

$$y_{nm,t} = z_{nm,t}\theta_{nm,r} + \alpha_{nm,r}, \forall (nm) \notin K, r \notin N_r - 1 \quad (2.7)$$

Bus and Line Limit Constraint

Real and reactive power flow of de-energized transmission lines should be equal to zero, as shown in (2.8)-(2.9). Voltage profiles should be maintained between 95% to 105% of nominal voltage in (2.10).

$$-M\overline{u}_{nm,t}^{line} \le P_{nm,t}^{flow} \le M\overline{u}_{nm,t}^{line} \quad (2.8)$$

$$-M\overline{u}_{nm,t}^{line} \le Q_{nm,t}^{flow} \le M\overline{u}_{nm,t}^{line} \quad (2.9)$$

$$V^{min}\overline{u}_{b,t}^{bus} \le V_{b,t} \le V^{max}\overline{u}_{b,t}^{bus} \quad (2.10)$$

Real and Reactive Loads Constraints

The static load model, namely a ZIP model is applied herein. The non-linear ZIP load model together with its linear equivalent is presented in (2.11).

$$P_{l,t}^{max} \le \left(\mu_p + \mu_l\frac{V_{b,t}}{V_0} + \mu_z\left(\frac{V_{b,t}}{V_0}\right)^2\right)P_{l,V_0} \approx \quad (2.11)$$

$$\left(\mu_p - \mu_z + \left(\frac{V_{b,t}}{V_0}\right)(\mu_l + 2\mu_z)\right)P_{l,V_0}$$

where, $P_{l,V_0}$ represents real power demand at bus 1 and nominal voltage $V_0$. Real and reactive loads can be restored only after energizing their respective buses, as shown in (2.12)-(2.13). The reactive load pickup limit is shown in (2.14).

$$0 \le P_{l,t} \le P_{l,t}^{max}\overline{u}_{b_j,t}^{bus} \quad (2.12)$$

$$0 \le P_{l,t} \le Q_{l,t}^{max}\overline{u}_{b_j,t}^{bus} \quad (2.13)$$

$$Q_{l,t} \le P_{l,t}\tan(\arccos(pf_l)) \quad (2.14)$$

Load Pickup and Dynamic Reserve Constraint

A load pickup limit is modeled in (2.15), where $\Delta P_t$ is the system load pickup capability at restoration time t. This capability can be estimated by having system inertia, governor ramp rate and dead band, and minimum allowable frequency dip. See H. Chávez, R. Baldick, and S. Sharma, "Governor rate-constrained OPF for primary frequency control adequacy," IEEE Trans. Power Syst., vol. 29, no. 3, pp. 1473-1480, May 2014, incorporated herein by reference, as expressed in (2.16).

$$\sum_{l \in L} P_{l,t+1} - \sum_{l \in L} P_{l,t} \le \Delta P_t \quad (2.15)$$

$$\Delta P_t \le \sqrt{2\overline{R}_{g,t}\overline{M}_t(f_0 - f_{min} - f_{db})} \quad (2.16)$$

$$\Delta P_{l,t} = P_{l,t+1} - P_{l,t} \le \Delta P_{l,t}^{max} \quad (2.17)$$

where, $\overline{R}_{g,t}$ (MW/s) and $\overline{M}_t$ (MW·s/Hz) are constant parameters that can be calculated right after determining the first-stage decisions. Also, there should be enough dynamic reserve to survive the frequency decay as a consequence of largest generation unit's trip (i.e., becoming offline). In equation (2.17), the maximum load pickup capability is restricted by $\Delta P_{l,t}^{max}$, whose value is derived from the frequency-constrained second sub-problem. The dynamic reserve is composed of two parts, governor response of conventional generation units and loads with under-frequency load shedding relays, as shown in (2.18).

$$P_t^{dyn} \le \sum_{l \in L_{sh}} P_{l,t}^{shed} + \sum_{g \in G} P_{g,t}^{dyn} \quad (2.18)$$

In (2.19), $P_t^{dyn}$ limits the maximum contribution of generator g to the total dynamic reserve at restoration time t. Constraint (2.20) represents that each generation unit's power level should be limited to maintain system reliability. In (2.21), it is assumed that less than 50% of dynamic reserve in a system should be devoted to the loads with under-frequency load shedding relays.

$$P_{g,t}^{dyn} \le \min(\Delta P_t, P_g^{max} - P_{g,t}) \quad (2.19)$$

$$P_{g,t} \le P_t^{dyn} - P_{g,t}^{dyn} \quad (2.20)$$

$$\sum_{l \in L_{sh}} P_{l,t} \le 0.5 P_t^{dyn} \quad (2.21)$$

Integer L-Shaped Solution Algorithm

The restoration problem (1)-(2) (in 1, 1.1, . . . , 1.6 and 2, 2.1, . . . , 2.21) can be represented as a general form of the following:

$$\text{Minimize}\{c^T x + Q(x)\} \quad (3)$$

subject to:
constraints (1.1)-(1.6), (2.1)-(2.21)
where x represents the first-stage decision variables and Q(x) is the recourse function. Let (4) be the relaxed master problem (RMP), the variable φ is estimated second-stage objective function for a given first-stage solution.

$$\text{Minimize}\{c^T x + \phi\} \quad (4)$$

subject to:
constraints (1.1)-(1.6)
integer L-shaped cuts

The general integer L-shaped optimality cut is defined in (5) and imposed for each first-stage feasible integer solution.

$$\phi \geq (Q(x^v) - LB)\left(\sum_{i \in S^v} x_i - \sum_{i \notin S^v} x_i - |S(x^v)| + 1\right) + LB \quad (5)$$

$$v = 1, 2, 3, \ldots, D$$

where, $S^v := \{i : x_i^v = 1\}$ is the set of $v^{th}$ feasible solution, and $|S(x^v)|$ shows the number of current first-stage decision variables with positive values. Note that $$\sum_{i \in S^v} x_i - \sum_{i \notin S^v} x_i$$

is always less than or equal to the $|S(x^v)|$. When x is the $v^{th}$ feasible solution, the right hand side of (5) takes the value of $Q(x^v)$ Otherwise, it is always less than or equal to LB. The decomposition algorithm based on the integer L-shaped method can be summarized as follows:

Step 1: Set iteration count D=0, lower bounding constraint LB=0, and the best known objective function $\bar{z}=\infty$. Create the first pendant node. Note that the set of integer L-shaped cutes is empty at this step.

Step 2: From the search tree, a pendent node is selected. If pendant node (i.e., sub-problem) does not exist, the algorithm is terminated and the best solution is printed. The algorithm stops when there are no more sub-problems for processing.

Step 3: Set D=D+1 and solve the RMP (4) and let $z=c^T x^D + \phi^D$ be its optimal value.

Step 3.1: If the current problem has no feasible solution or $z \geq \bar{z}$, fathom the current node and go to step 2.

Step 3.2: If the current solution is not integer, create two new branches on fractional variables and append them to the list of pendant nodes and go to step 2.

Step 3.3: If the current solution is integer, compute the second-stage problem (2), let $z^D = c^T x^D + Q(x^D)$ and update the new best solution $\bar{z}=\min\{\bar{z}, z^D\}$.

Step 4: If $\phi^D \geq Q(x^D)$, then fathom the current node and go to step 2. If $\phi^D < Q(x^D)$, generate an integer L-shaped cut (5), insert it into (4) and go to step 2.

Integer L-Shaped Optimality Cut

The general form of the optimality cut presented in (5) introduces a relationship between the first-stage decision x and the second stage objective function Q(x). This cut yields a very promising result for the convergence time, given that the first-stage decision is feasible for the second-stage problem. However, when the first-stage solution is not feasible for the second-stage problem, the convergence time will generally increase remarkably. To cope with this problem, a strong linear optimality cut based on the linearized form of AC power flow formulation presented in (2.6) can be used.

The optimality cut is expressed in (6) showing that the reactive power balance should be held at each restoration time. The left hand side of the inequality constraint (6) controls the number of energized lines $u_{nm,t}^{line}$, by considering the number of online generators $u_{On}^{i,t}$, and total restored reactive load $\bar{Q}_t^{tot}$. Indeed, the line charging current $\bar{Q}_{nm,t}^{ch}$ and reactive power loss $\bar{Q}_{nm,t}^{loss}$ vary with the number of energized transmission lines. Since at early phases of restoration process, only a few generators are online, causing a limited active/reactive load pickup capability and reactive power absorption capacity, the number of energized line should be restricted.

$$\sum_{nm \in K}(\bar{Q}_{nm,t}^{ch} - \bar{Q}_{nm,t}^{loss})u_{nm,t}^{line} + \sum_{nm \in K} Q_g^{min} u_{g,t}^{on} \leq \bar{Q}_t^{tot} \quad (6)$$

Second-Level Problem (Non-Linear Algebraic Equations)

The classical generator model is adopted including the constant voltage ($E_g'$) behind the direct-axis transient reactance ($x_g'$). To calculate the initial conditions, two nonlinear equations (7) and (8) should be solved. The newton method is used to compute the $E_{g,t-1}'$ and $\delta_{g,t-1}$. The constant parameters $\bar{P}_{g,t-1}$, $\bar{Q}_{g,t-1}$, and $\bar{V}_{j,t-1}$ are obtained from the OR problem.

$$E_{g,t-1}' \bar{V}_{j,t-1} \sin(\delta_{g,t-1} - \bar{\theta}_{j,t-1}) - x_g' \bar{P}_{g,t-1} = 0 \quad (7)$$

$$E_{g,t-1}' \bar{V}_{j,t-1} \cos(\delta_{g,t-1} - \bar{\theta}_{j,t-1}) - \bar{V}_{j,t-1}^2 - x_g' \bar{Q}_{g,t-1} = 0 \quad (8)$$

Second sub-problem: (Frequency-constrained sub-problem)

Objective Function

The objective function of the second sub-problem is expressed in (9). It is intended to maximize the load pickup $\Delta P_{l,t}^{max}$ over the transient period n. The loads having the higher priorities and those showing better effects on the frequency profile will be identified and energized. That is, two loads having the same importance will be prioritized according to their impacts on the frequency response of the system.

$$\text{Maximize} \sum_{n \in N} \sum_{l \in L} \alpha_l \Delta P_{l,t}^{max}(n) \quad (9)$$

Generator Swing Equations

Using an implicit trapezoidal method, the swing equations are converted into a series of algebraic equations in (9.1) and (9.2), where $\omega_0$ is the synchronous rotating speed and $\Delta n$ is integration time step. Variable $P_{g,t}^e(n)$ is the electrical power of gth generator at the tth restoration time and nth transient simulation time step, which is given in (9.3).

$$\delta_{g,t}(n+1) - \delta_{g,t}(n) - \frac{\Delta n \omega_0}{2}[\omega_{g,t}(n+1) + \omega_{g,t}(n) - 2] = 0 \quad (9.1)$$

$$\omega_{g,t}(n+1) - \omega_{g,t}(n) - \quad (9.2)$$

$$\frac{\Delta n}{2M_g}[P_{g,t}^m(n+1) - P_{g,t}^e(n+1) + P_{g,t}^m(n) - P_{g,t}^e(n)] = 0$$

-continued $$P_{g,t}^e(n) - \frac{E'_{g,t} \overline{V}_{g,t}}{x'_g} \sin(\delta_{g,t}(n) - \theta_{g,t}(n)) = 0 \quad (9.3)$$

In (9.3), $\overline{V}_{g,t}$ is voltage of generation bus g which can be derived from OR functions in the original second-stage problem. The modeling of the turbine-governor is generally of greatest importance when studying frequency control and stability. The initial period of frequency response down to the nadir of the frequency deviation is governed by the initial rate of decline of frequency, which is a function of total system inertia and the primary-frequency control that is provided by turbine-generator governors. Also, the initial recovery in frequency is determined by both primary-frequency response and the load behavior.

Figure 3C:
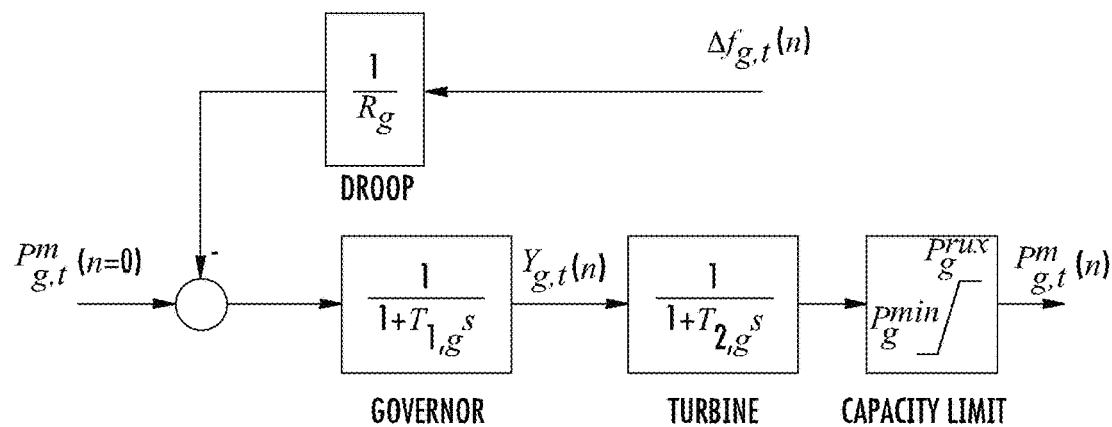
FIG. 3C shows an example frequency response model for generators.

In FIG. 3C, $R_g$ is droop characteristic of generator g, $T_{1,g}$ and $T_{2,g}$ are governor and turbine time constants. One can obtain $P_{g,t}^m(n)$, denoting generators' mechanical power, from the model. A discrete time approximation corresponding to the frequency response model in FIG. 3C can be found in (9.4) and (9.5).

$$P_{g,t}^m(n+1)\left(\frac{\Delta n}{2T_{2,g}} + 1\right) + \quad (9.4)$$
$$P_{g,t}^m(n)\left(\frac{\Delta n}{2T_{2,g}} - 1\right) - \frac{\Delta n}{2T_{2,g}}(Y_{g,t}(n) + Y_{g,t}(n+1)) = 0$$

$$Y_{g,t}(n+1)\left(\frac{\Delta n}{2T_{2,g}} + 1\right) + Y_{g,t}(n)\left(\frac{\Delta n}{2T_{1,g}} - 1\right) - \quad (9.5)$$
$$\frac{\Delta n}{2T_{1,g}} P_{g,t}^m(n=0) + \frac{\Delta n}{2T_{1,g} R_g}(\Delta f_{g,t}(n+1) + \Delta f_{g,t}(n)) = 0$$

Initial Conditions

Generators' angles $\delta_{g,t-1}$ are obtained from the nonlinear equations which set the initial conditions for optimization problem. Frequency of all buses as well as generator buses are set to $\omega_0$. At the steady state condition, mechanical power $P_{g,t}^m$ (n=0) and electrical power $P_{g,t}^e$(n=0) are assumed to be equal in (9.8).

$$\delta_{g,t}(n=0)=\delta_{g,t-1} \quad (9.6)$$

$$\omega_{j,t}(n=0)=\omega_0 \quad (9.7)$$

$$P_{g,t}^e(n=0)=P_{g,t}^m(n=0)=P_{g,t-1} \quad (9.8)$$

Load Pickup Constraints

It is assumed that load pickup actions occur only at $n=n_0$, thereafter, neither load shedding nor load pickup is permitted until the end of the transient period. Maximum load pickup amount during the transient period is $\Delta P_{l,t}^{max}(n)$.

$$\Delta P_{l,t}^{max}(n)=0 \quad \forall n<n_0 \quad (9.9)$$

$$\Delta P_{l,t}^{max}(n+1)-\Delta P_{l,t}^{max}(n)=0 \quad \forall n\geq n_0 \quad (9.10)$$

Active power balance at load buses are dynamically changes as the load is energized and reflects its impact on the frequency response. Constraint (9.11) shows power balance at load bus 1 where $D_l$ is load-frequency dependency of load, and $\Delta f_{l,t}(n)$ is the frequency deviation at load bus 1.

$$\overline{P}_{l,t-1}(1 + D_l \Delta f_{l,t}(n)) + \Delta P_{l,t}^{max} + \Delta P_{l,t} = \sum_{ij \in K} P_{ij,t}(n) \quad (9.11)$$

Frequency Constraint

Frequency of generator as well as load buses should not violate the minimum acceptable limit.

$$\Delta f_{b,t} \leq f_0 - \bar{f}_{nadir} \quad (9.12)$$

Load Dynamic Model

The dynamic portion of the loads, pertaining to the induction and synchronous motors, are incorporated into the second sub-problem to improve the accuracy of the calculation. A first-order linear model $$\Delta P_l(s) = \frac{k_{lf} + T_{lf}s}{1 + T_l s}$$

can be used whose discretized form can be written as:

$$\Delta P_{l,t}(n+1)\left(\frac{2T_l}{\Delta n} + 1\right) + \Delta P_{l,t}(n)\left(1 - \frac{2T_l}{\Delta n}\right) = \quad (9.13)$$
$$\left(k_{lf} + \frac{2T_{lf}}{\Delta n}\right)\Delta f_{l,t}(n+1) + \left(k_{lf} - \frac{2T_{lf}}{\Delta n}\right)\Delta f_{l,t}(n)$$

Examples

Disclosed embodiments of the invention are further illustrated by the following specific Examples, which should not be construed as limiting the scope or content of this Disclosure in any way.

ARDSS Implementation

To evaluate the adaptivity and computational efficiency of a disclosed ARDSS, a case study was performed on an IEEE-39 bus system which is well known as a 10-machine New-England Power System. The IEEE 39-bus system has 10 generators and 46 lines.

The restoration solution was assessed in a base case and in a contingency case. A complete black-out condition for the power outage is assumed and one BSU (G10) and nine NBSUs (G1-G9) were participating in the restoration process. The power generators' characteristics and system load values and priorities are listed in Tables I and II shown below. Each restoration time is assumed to be 10 minutes, which can be adjusted by system operators. The base power is assumed to be 100 MW and the frequency nadir following a load pickup step is assumed that it should not exceed 59.6 Hz. The ARDSS with an integer L-shaped algorithm was implemented in C++ using the Concert Technology library of IBM ILOG CPLEX 12.6. A callback feature in CPLEX was used in which the second-stage problem is embedded and optimality cuts will be added to the master problem at each iteration. The advantage of this advanced computational feature is that it explores the entire search tree only once, which greatly reduces the computing time. All simulations were executed on a Personal Computer with an INTEL CORE i5 CPU @3.30 GHz and 8 GB RAM.

TABLE I

Generators' characteristics

| Gen No. | $P_g^{min}$ (MW) | $P_g^{max}$ (MW) | $Q_g^{min}$ (MVar) | $Q_g^{max}$ (MVar) | $P_g^{start}$ (MW) | Bus No. |
|---|---|---|---|---|---|---|
| 1 | 0 | 570 | −200 | 300 | 5 | 31 |
| 2 | 0 | 650 | −250 | 300 | 7 | 32 |
| 3 | 0 | 630 | −250 | 250 | 5 | 33 |

TABLE I-continued

Generators' characteristics

| Gen No. | $P_g^{min}$ (MW) | $P_g^{max}$ (MW) | $Q_g^{min}$ (MVar) | $Q_g^{max}$ (MVar) | $P_g^{start}$ (MW) | Bus No. |
|---|---|---|---|---|---|---|
| 4 | 0 | 600 | −220 | 300 | 8 | 34 |
| 5 | 0 | 650 | −200 | 300 | 6 | 35 |
| 6 | 0 | 560 | −200 | 300 | 6 | 36 |
| 7 | 0 | 560 | −200 | 200 | 6 | 37 |
| 8 | 0 | 830 | −300 | 300 | 7 | 38 |
| 9 | 0 | 1100 | −400 | 500 | 8 | 39 |
| 10 | 0 | 250 | −150 | 150 | 0 | 30 |

TABLE II

Load values and priorities

| Bus | $P_{load}^{max}$ (MW) | Priority | U/f relay |
|---|---|---|---|
| 3 | 322 | 1.0 | No |
| 4 | 500 | 0.8 | Yes |
| 7 | 233 | 1.0 | No |
| 8 | 522 | 1.0 | No |
| 12 | 7.5 | 1.0 | No |
| 15 | 320 | 1.0 | Yes |
| 16 | 322 | 1.0 | No |
| 18 | 185 | 1.0 | No |
| 20 | 680 | 1.0 | No |
| 21 | 274 | 0.9 | No |
| 23 | 247 | 0.8 | Yes |
| 24 | 308 | 1.0 | No |
| 25 | 224 | 0.9 | No |
| 26 | 139 | 1.0 | No |
| 27 | 281 | 1.0 | No |
| 28 | 206 | 0.9 | No |
| 31 | 9.2 | 1.0 | No |
| 39 | 1100 | 1.0 | No |

TABLE III

Load values and priorities

| Generator No. | First-stage solution | Normal case ARDSS solution | Contingency case ARDSS solution |
|---|---|---|---|
| G1 | 12 | 16 | 22 |
| G2 | 13 | 18 | 20 |
| G3 | 13 | 17 | 17 |
| G4 | 14 | 18 | 18 |
| G5 | 14 | 18 | 19 |
| G6 | 14 | 18 | 18 |
| G7 | 9 | 9 | 9 |
| G8 | 11 | 16 | 16 |
| G9 | 9 | 9 | Out of service |
| G10 | 2 | 2 | 2 |

Test results are presented based on running a disclosed ARDSS for the IEEE 39-bus system, and the results are shown in Table III above, where the first column shows the decisions by only solving the first-stage problem. When inserting these decisions into the second-stage problem, a large infeasibility penalty factor resulted. Thus, the optimality cuts are generated that are added to first-stage problem to re-adjust the initial decisions. The second-column of Table III indicates the adjusted solution, which is feasible for both first and second-stage problems. One can see that without considering practical constraints for load pickup in the second stage, the generator start-up sequence can become impractical to deploy.

Figure 4:
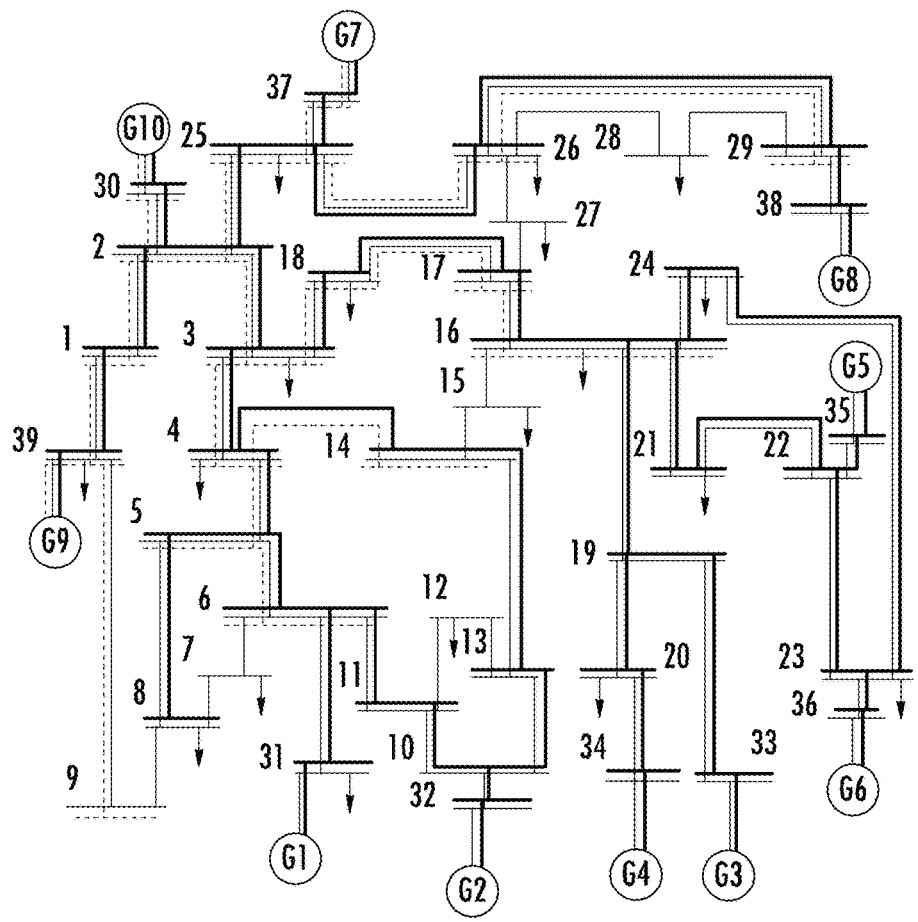
FIG. 4 shows a comparison between a restoration path, a conventional first-stage solution (solid line) and a disclosed ARDSS solution (dotted line) for a t=11 time interval restoration period.
Figure 5:
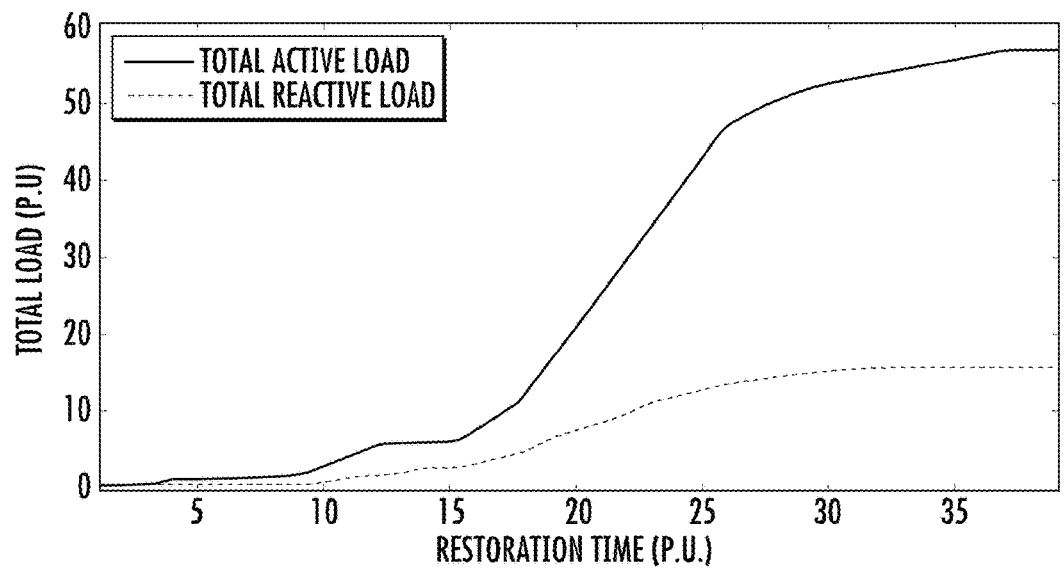
FIG. 5 shows total active and reactive load curves during a restoration period.
Figure 6:
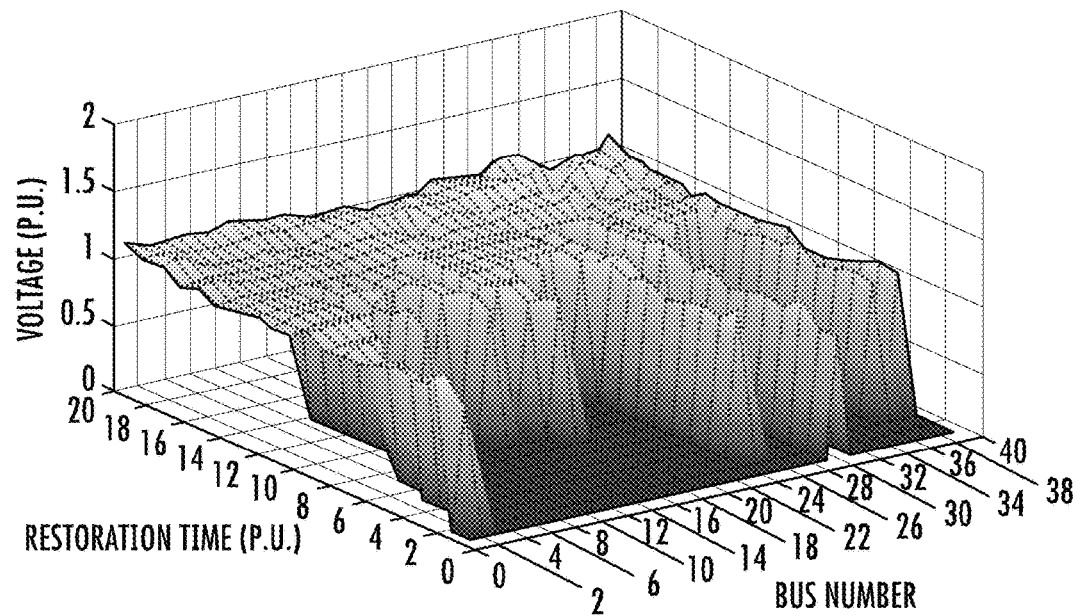
FIG. 6 shows a voltage profile before and after bus energization.

In FIG. 4 is a graphical representation of the power recovery process for the IEEE-39 bus system depicted for a t=11 restoration time. The solid lines, representing the known single-stage solution, shows the transmission lines and buses that have been energized. It is clear from FIG. 4 that all generation units have their cranking paths established by that time. Whereas, for the ARDSS shown by the dotted lines, only two generators G7 and G9 have the established cranking paths and the restoration paths have been altered significantly. The ARDSS restoration curve is plotted for entire restoration process and is shown in FIG. 5. The load pickup process is started after restoration time t=4 when the first load bus becomes energized, and is terminated after restoration time t=38. System generation and load are balanced at all times, while voltage profiles are maintained within an acceptable range, as shown in FIG. 6.

Restoration Under Contingency

Figure 7:
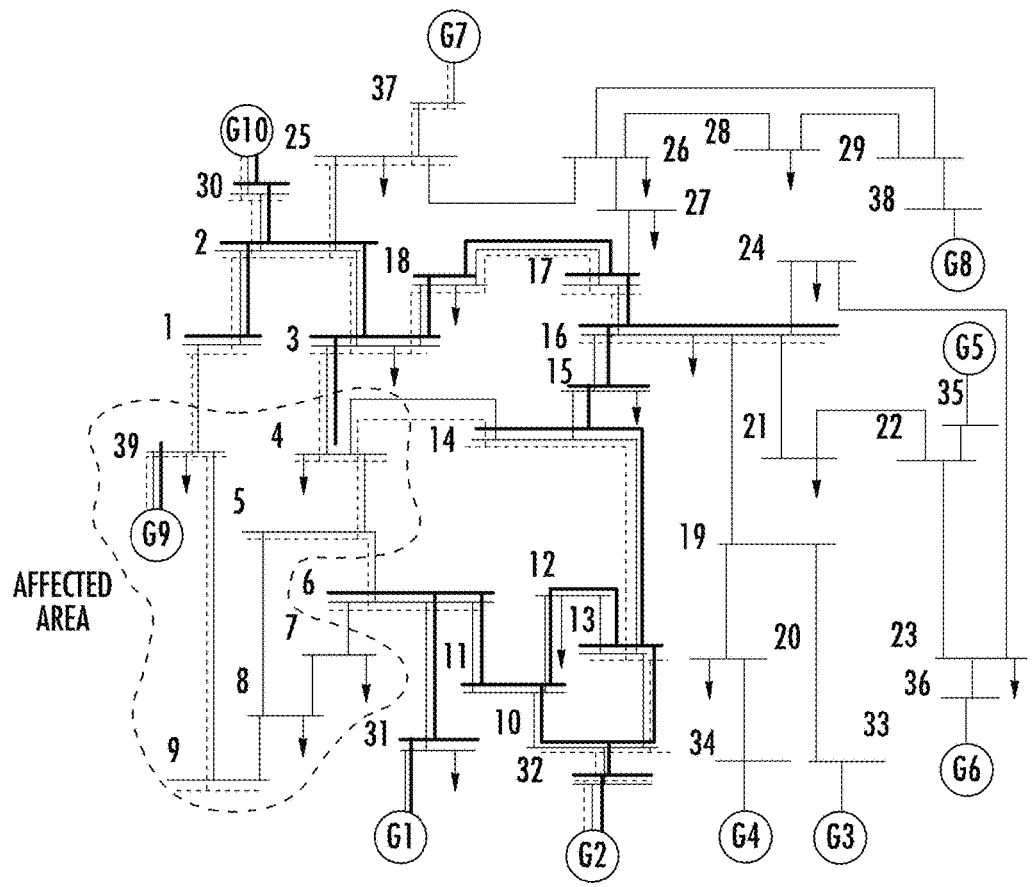
FIG. 7 shows initial restoration paths for generators G1 and G2 (dotted lines), and alternative restoration paths for generators G1 and G2 (solid lines) after the occurrence of a major contingency.

In this case the response of the ARDSS to a major contingency during the restoration period was studied. To this end, it was assumed that a contingency happens at t=11 restoration time, and the affected area of the power grid due to the contingency is shaded as shown in FIG. 7. This contingency results in the trip of power generation unit G9 together with the outage of the energized transmission lines (1-39), (3-4), (4-5), (4-14), (39-9), and (5-6). Also, it was assumed that transmission line (6-7) is out of service due to maintenance and repair.

In FIG. 7 the dotted lines show the ARDSS decisions before the contingency and highlight the cranking paths of generators G1 and G2. However, this presents the initial ARDSS solution assuming that all transmission lines and buses (or sub-stations) remain in service during the restoration process. When a contingency occurs, the ARDSS quickly adapts to the changing system conditions, and computes a new restoration solution by again solving a two-stage problem including a first-stage problem and a second-stage problem with an OP function. The ARDSS initial solution ensures sufficient dynamic reserve during the transition, while the updated solution guarantees the availability of new restoration paths. As a result, the restoration process is robust and adaptive to system contingencies.

In order to validate the outcome of the frequency-constrained sub-problem, a power system simulation program (PSS/E) was adopted to run time-domain simulation. Right before the contingency occurs, total system load was 380 MW and generation units G10, G7 and G9 are responsible for load pickup. The maximum amount of dynamic reserve at this time is 230 MW. As shown in FIG. 8A, after the trip of generation unit 9, the loss of 130 MW power supply is compensated by governor responses of two online generators, as well as load shedding at buses 4 and 39. The frequency nadir shown in FIG. 8B is well maintained above the minimum permissible frequency, and the system survives under the contingent condition.

Then, the ARDSS quickly generates a new solution representing the alternative restoration paths, as shown by the solid lines in FIG. 7. Specifically, transmission lines (5-6) and (4-14) are in the cranking path of generation units G1 and G2. With the loss of these two lines, alternative paths are computed by the ARDSS. The new generation start-up times can be found in Table III. One can observe that the start-up time of generation units G1, G2, and G5 have been changed under the new plan. FIG. 9 shows the load restoration curve before and after contingency separated by the load shedding event at t=11.

ARDSS Performance

The ARDSS can be used online in real-time operation due to its greatly improved computational performance. The computational performance improvement is two-fold. The combinatorial problem is successfully decomposed into a two-stage formulation, which largely reduces the search of the entire feasibility region. The computational burden is further reduced by the ARDSS sliding-window framework, which only involves solving the second-stage problem (using an OR function) in real-time operation unless a contingency occurs. The performance for the disclosed two-stage decomposition ARDSS framework is given at different restoration times in Table IV below, compared with a known original single-stage problem solution without any decomposition. The ARDSS clearly demonstrates superior performance that is suitable for real-time restoration.

TABLE IV

Comparison of ARDSS Solution Times respect to the Time of the Execution for IEEE 39-bus System with Optimality Gap = 1%

| Optimization problem | t = 0 | t = 10 | t = 20 |
|---|---|---|---|
| Without decomposition | 1287 (sec) | 968 (sec) | 245 (sec) |
| Two-stage ARDSS | 428 (sec) | 315 (sec) | 65 (sec) |
| ARDSS-OR | 68.8 (sec) | 42.5 (sec) | 15.2 (sec) |
| Frequency constraint sub-problem | — | 48.5 (sec) | 264 (sec) |

OR Problem with Added Sub-Problems:

A modified IEEE-39 bus system was adopted to demonstrate the effectiveness of a disclosed ARDSS. The power system included 10 generators whose dynamic characteristics are reported in Table V. Note that the GAST model is employed for representing the governors' of generators G1 to G5, whereas the TGOV1 model is utilized for generators G6 to G10. In the original second-stage problem, it is assumed that the load pickup action is carried out every 5 min. The second sub problem is solved for 6 s with an integration time step of $\Delta n=0:01$ s (i.e. N=600). The minimum permissible frequency nadir is set to fnadir=59.8 Hz. The loads' dynamic characteristics are indicated in Table VI.

TABLE V

Parameters of GAST and TGOV1 models and generators' inertia (1,000 MVA base power).

| GAST | | | | | | | |
|---|---|---|---|---|---|---|---|
| T1 | T2 | T3 | Dturb | AT | KT | Vmax | Vmin |
| 0.4 | 0.2 | 3.0 | 0 | 1.0 | 2.0 | 0.95 | 0 |

| TOGV1 | | | | | | |
|---|---|---|---|---|---|---|
| T1 | T2 | T3 | Dturb | AT | Vmax | Vmin |
| 0.2 | 1.0 | 2.0 | 0 | 1.0 | 1.0 | 0 |

| H(s) | | | | | | |
|---|---|---|---|---|---|---|
| G30 | G31 | G32 | G33 | G34 | G35 | G36 |
| 4.2 | 4.329 | 4.475 | 3.575 | 4.33 | 4.35 | 3.77 |
| G37 | G38 | G39 | | | | |
| 3.471 | 3.45 | 5.0 | | | | |

TABLE VI

Loads' Dynamic Characteristics.

| Bus | $k_{lf}$ (%/%) | $t_{lf}$ (s) | $\alpha_l$ |
|---|---|---|---|
| 3 | 1.1 | 0.18 | 1.0 |
| 4 | 1.3 | 0.85 | 0.8 |
| 7 | 1.2 | 0.3 | 1.0 |
| 8 | 1.15 | 1.25 | 1.0 |
| 12 | 1.4 | 0.2 | 1.0 |
| 15 | 1.3 | 1.1 | 0.8 |
| 16 | 1.25 | 0.6 | 1.0 |
| 18 | 1.4 | 0.75 | 0.9 |
| 20 | 1.2 | 1.25 | 1.0 |
| 21 | 1.3 | 0.4 | 1.0 |
| 23 | 1.1 | 0.25 | 0.8 |
| 24 | 1.2 | 0.65 | 1.0 |
| 25 | 1.3 | 0.3 | 1.0 |
| 26 | 1.1 | 0.2 | 1.0 |
| 27 | 1.4 | 0.88 | 1.0 |
| 28 | 1.3 | 1.2 | 1.0 |
| 31 | 1.2 | 0.5 | 1.0 |
| 39 | 1.2 | 0.35 | 1.0 |

Figure 10A:
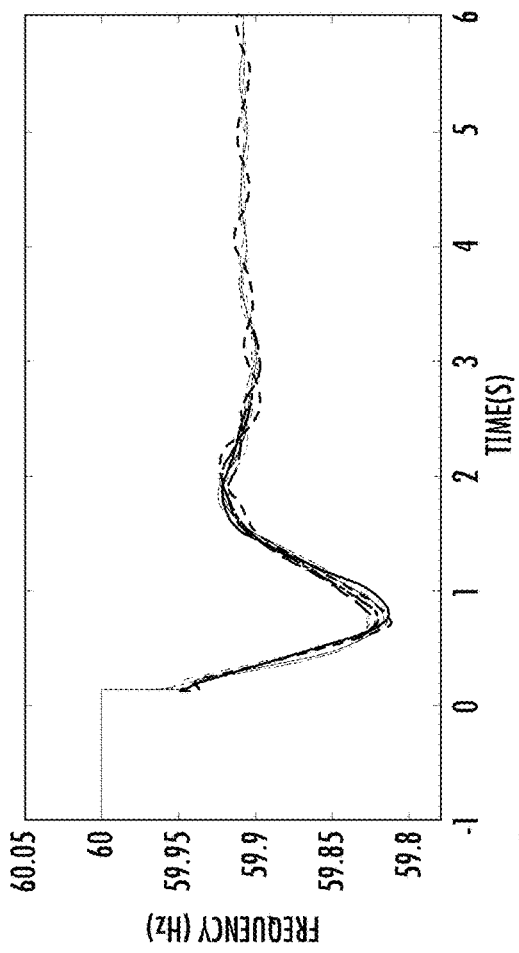
FIG. 10A shows a simulated frequency vs. time plot for a frequency droop (Rg)=2%.
Figure 10B:
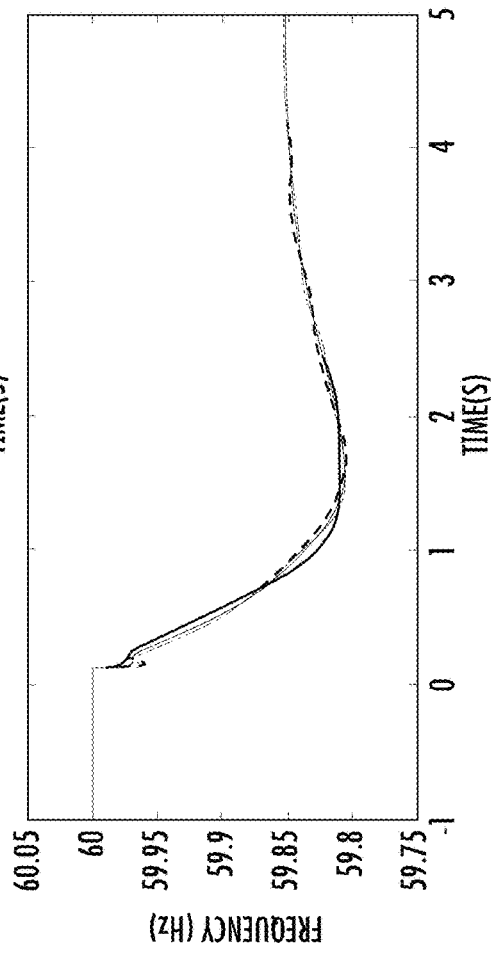
FIG. 10B shows a simulated frequency vs. time plot for a Rg=6%.

The optimal load pickup location and amount derived from a disclosed ARDSS with added sub-problems is now described. Table VII (below) shows the optimal amount and location with respect to the different Rg. The loads with the same priorities but different load-frequency dependency factors are not treated similarly. Indeed, loads with greater influence on the frequency response and with higher priority will generally be recovered first. Also, loads' locations play a critical role that has been taken into the account. To assess the accuracy of the solutions presented in Table VII, a power system simulation program (PSS/E) was adopted. A load pickup study case was created in the time-domain simulation environment according to the load values and locations reported in Table VII. FIGS. 10A and B show the frequency of generator buses 30 to 39 for different droop coefficients. The FIG. 10A upper plot shows the simulated frequency vs. time plot for an Rg=2%, and the FIG. 10B lower plot pertains to the simulated frequency vs. time plot for an Rg=6%. These results verify that the minimum frequency constraint (9.12) with fnadir=59:8 Hz has not been violated for different droop coefficients. Furthermore, the disclosed load pickup locations resulted in an identical impact on the frequency traces at different generator buses.

TABLE VII

Optimal location and amount of load pickup for various frequency droop values (Rg = 2% and 6%.)

| Droop | Load | Value |
|---|---|---|
| Rg = 2% | 8 | 190.4 |
| | 12 | 5.0 |
| | 20 | 132.9 |
| | 21 | 100 |
| | 25 | 48.97 |
| | 27 | 81.31 |
| | 28 | 100.0 |
| | 39 | 65.58 |
| Rg = 6% | 7 | 105.0 |
| | 8 | 25.8 |
| | 20 | 55.42 |
| | 21 | 95.78 |
| | 25 | 59.06 |
| | 28 | 33.13 |
| | 31 | 9.0 |
| | 39 | 4.66 |

The invention claimed is:

1. A method of self-healing an electrical power grid including transmission lines and loads after a power outage, comprising:
   providing an Adaptive Restoration Decision Support System (ARDSS) for generating a restoration solution from said power outage by using received static and dynamic input data from at least one power generator providing power to said power grid, from said transmission lines, and from said loads;
   at a beginning of a restoration period that is triggered following said power outage solving a two-stage problem including a first-stage problem and a second-stage problem with optimal planning (OP) function as a mixed-integer linear programming (MILP) problem using initial said static and dynamic input data to determine start-up times for said power generators when involved in said power outage and energization sequences for ones of said transmission lines involved in said power outage;
   solving only said second-stage problem again with optimal real-time (OR) function using said start-up times and energization sequences along with updated said static and dynamic input data to determine a plurality of operating parameters for said power grid, and
   implementing said restoration solution over a plurality of restoration time steps until all said loads involved in said power outage are recovered.

2. The method of claim 1, wherein said OR function comprises a simplified version said OP function, and wherein a computation time for solving only said second-stage problem with said OR function is less than a computation time for solving said two-stage problem using said OR function.

3. The method of claim 1, wherein said solving said second-stage problem further comprises solving additional sub-problems including computing initial conditions for said power generator using non-linear algebraic equations, solving a linear optimization problem that calculates a frequency response of said power grid as one of said plurality of operating parameters and determines pickup locations and sizes for said loads as others of said plurality of operating parameters.

4. The method of claim 1, wherein said ARDSS is integrated into an energy management system (EMS) that is in a control room a power system including said power grid.

5. The method of claim 3, wherein said plurality of operating parameters further comprise a dynamic reserve allocation of said power generator, a voltage profile of said power grid, a power flow for said transmission lines, an optimal power output for said power generator, and real and reactive power losses.

6. The method of claim 1, wherein said OP function is again executed to resolve said two-stage problem responsive to a contingency occurring during said restoration period.

7. The method of claim 1, wherein said ARDSS comprises an integer L-shaped algorithm, and auxiliary variables and optimality cuts are included in said second-stage problem.

8. The method of claim 1, wherein said static inputs include power system topological information including parameters from said transmission lines and said power generator, and said dynamic inputs are states of a power system including said power grid updated in real-time with said updated dynamic input data provided by phasor measurement units (PMUs) or a supervisory control and data acquisition (SCADA) system.

9. An adaptive restoration decision support system (ARDSS) for implementing a method of self-healing an electrical power grid by generating a restoration solution from a power outage in said electrical power grid powered by at least one power generator comprising transmission lines and loads, said ARDSS comprising:
   a computer system comprising a processor having an associated memory or digital logic for implementing said method, said method comprising:
   said ARDSS generating said restoration solution from said power outage by using received static and dynamic input data from said power generator, from said transmission lines, and from said loads;
   at a beginning of a restoration period that is triggered following said power outage solving a two-stage problem including a first-stage problem and a second-stage problem with optimal planning (OP) function as a mixed-integer linear programming (MILP) problem using initial said static and dynamic input data to determine start-up times for said power generators when involved in said power outage and energization sequences for ones of said transmission lines involved in said power outage;
   solving only said second-stage problem again with optimal real-time (OR) function using said start-up times and energization sequences along with updated said static and dynamic input data to determine a plurality of operating parameters for said power grid, and
   implementing said restoration solution over a plurality of restoration time steps until all said loads involved in said power outage are recovered.

10. The system of claim 9, wherein said OR function comprises a simplified version said OP function, and wherein a computation time for solving only said second-stage problem with said OR function is less than of a computation time for solving said two-stage problem using said OR function.

11. The system of claim 9, wherein said solving said second-stage problem further comprises solving additional sub-problems including computing initial conditions for said power generator using non-linear algebraic equations, solving a linear optimization problem that calculates a frequency response of said power grid as one of said plurality of operating parameters and determines pickup locations and sizes for said loads as others of said plurality of operating parameters.

12. The system of claim 9, wherein said ARDSS is integrated into an energy management system (EMS) that is in a control room a power system including said power grid.

13. The system of claim 11, wherein said plurality of operating parameters further comprise a dynamic reserve allocation of said power generator, a voltage profile of said power grid, a power flow for said transmission lines, an optimal power output for said power generator, and real and reactive power losses.

14. The system of claim 9, wherein said OP function is again executed to resolve said two-stage problem responsive to a contingency occurring during said restoration period.

15. The system of claim 9, wherein said ARDSS comprises an integer L-shaped algorithm, and auxiliary variables and optimality cuts are included in said second-stage problem.

16. The system of claim 9, wherein said static inputs include power system topological information including parameters from said transmission lines and said power generator, and said dynamic inputs are states of said power system including said power grid updated in real-time with said updated dynamic input data provided by phasor measurement units (PMUs) or a supervisory control and data acquisition (SCADA) system.

* * * * *